United States Patent [19]
Carson et al.

[11] Patent Number: 5,905,724
[45] Date of Patent: May 18, 1999

[54] MESSAGE MODIFICATION APPARATUS FOR USE IN A TELECOMMUNICATION SIGNALLING NETWORK

[75] Inventors: Douglas John Carson, Edinburgh; James Robertson Galloway, Scone; Salih Kabay, Edinburgh; Peter John Mottishaw, South Queensferry, all of United Kingdom

[73] Assignee: Hewlett-Packard Limited, Palo Alto, Calif.

[21] Appl. No.: 08/801,399

[22] Filed: Feb. 20, 1997

[30] Foreign Application Priority Data

Feb. 26, 1996 [GB] United Kingdom ............... 9604379
Jul. 30, 1996 [GB] United Kingdom ............... 9615998

[51] Int. Cl.$^6$ ........................................ H04J 3/12
[52] U.S. Cl. ........................................ 370/385
[58] Field of Search ............... 370/219, 220, 370/217, 218, 221, 222, 225, 227, 228, 226, 229, 241, 242, 243, 244, 246, 250, 252, 384, 385, 522, 469

[56] References Cited

U.S. PATENT DOCUMENTS 5,341,430  8/1994  Aulia et al. ................. 370/217
5,475,732  12/1995  Pester, III ................. 370/217
5,546,398  8/1996  Tucker et al. .

FOREIGN PATENT DOCUMENTS 0 669 771 A1  8/1995  European Pat. Off. .
WO 95/35633  12/1995  WIPO .

OTHER PUBLICATIONS

European Search Report, EP 97 30 0819, Sep. 23, 1998.
Research Disclosure, No. 365, Sep. 1994, p. 491, Emsworth, "Fraud Suppression Techniques Using 557 Protocol Analyzers".
SuperComm/ICC'92, vol. 3, Jun. 14, 1992, pp. 1385–1391, Wilson et al., "A Network Control Architecture for Bandwidth Management".
IEEE Journal On Selected Areas In Communications, vol. 12, No. 3, pp. 456–461, Hou et al., "Error Monitoring Issues for Common Channel Signaling".

*Primary Examiner*—Huy D. Vu

[57] ABSTRACT

A programmable message substitution unit PMSU (60) is provided for modifying signalling messages passing across a link (61) of a telecommunications signalling network without disrupting the link-level procedures operating over the link. In the event of a power failure or upon the detection of an operational anomaly, a bypass relay arrangement (65) is used to bypass the PMSU (60). The PMSU (60) comprises a substitution block for modifying selected messages, a database block for doing database lookups to ascertain new message parameter values to be substituted for existing ones, and a supervision block for checking the operation of the substitution block. The PMSU may be used to implement local number portability or other services.

17 Claims, 9 Drawing Sheets

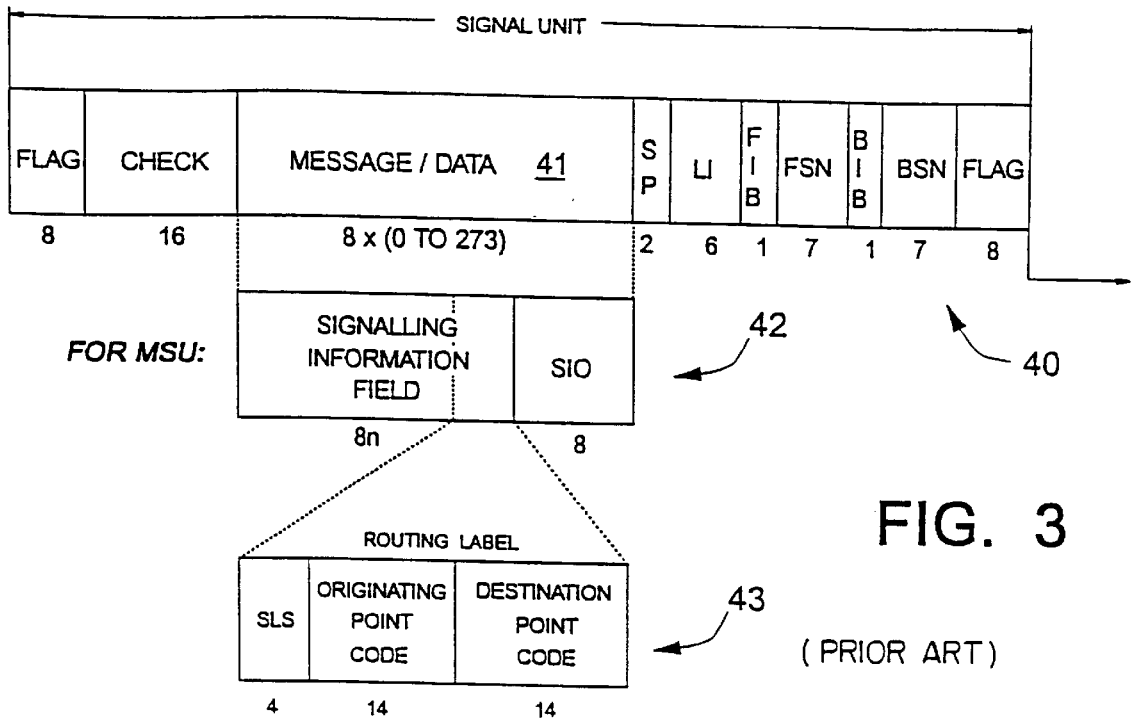
FIG. 3 (PRIOR ART)
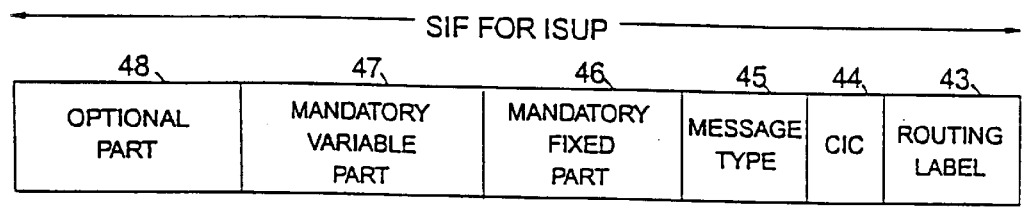
(PRIOR ART)    FIG. 4
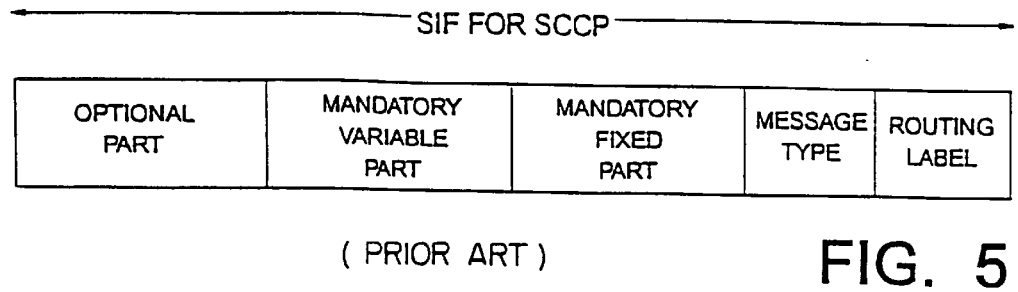
(PRIOR ART)    FIG. 5

MESSAGE MODIFICATION APPARATUS FOR USE IN A TELECOMMUNICATION SIGNALLING NETWORK

FIELD OF THE INVENTION

The present invention relates to message modification apparatus for use in a telecommunications signalling network. The present invention has particular application to telecommunication signalling networks operating substantially in accordance with Signalling System No. 7, whether as specified by the ITU-TS (formerly CCITT), ANSI, ETSI (for GSM), Bellcore or similar body, such a network being herein referred to as an SS7 network. The CCITT Signalling System Number 7 is specified in Recommendations Q.700–Q.716 CCITT Volume VI—Fascicle VI.7, Geneva 1989, ISBN 92-61-03511-6 which is herein incorporated by reference.

BACKGROUND OF THE INVENTION

Signalling in Modern Telecommunications Systems

In modern switched telecommunication systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentioned Signalling System No. 7 (SS7) which is being extensively deployed for control of telephone and other data transmission networks. An SS7 network basically comprises various types of signalling points, namely, signalling end points (SEPs) and signalling transfer points (STPs) interconnected by signalling links, the SEPs being associated for example with respective service switching points (SSPs) of the transmission network, and with service control points (SCPs).

Referring to FIG. 1, an SS7 network 10 is shown intercommunicating three signalling end points constituted by two service switching points SSPs 11 (between which extend speech circuits 12 of a transmission network not further illustrated) and a service control point SCP 13. The SCP serves to implement particular services (sometimes called IN, or Intelligent Network, services) in response to service requests received from an SSP, such a service request being generated by an SSP upon certain trigger conditions being met in the SSP in respect of a call that it is handling. A typical service may involve the translation of the dialled number (called party number) to a different number, the SCP returning this latter number to the SSP to enable the latter to complete call setup.

The SS7 network 10 includes two pairs 14 of signalling transfer points STPs, and a plurality of link sets 18 interconnecting the SSPs, SCP and STPs into a redundant network. Each signalling link set 18 is made up of one or more individual signalling links, the number of signalling links in a link set being chosen to provide appropriate capacity for the level of signalling traffic expected. The redundancy provided in respect of the STPs and links is to ensure that the failure of a single component of the network core does not cause the whole network to fail.

It should be noted that an SS7 network will typically comprise more STP pairs, SSPs and SCPs than illustrated. Service control functionality, as well as being provided in an SCP, can be provided in an Adjunct directly connected to an SSP.

Messages traversing the links of the network may be any of a large number of different types, depending on the nature of the call to which the message relates and the function specified by the message.

The SS7 Architecture

In order to facilitate an understanding of the present invention, a brief review will be given of the layered structure of the SS7 architecture and of the messages passed over the links of the network 10 to implement the SS7 architecture.

FIG. 2 illustrates the SS7 architecture. Levels 1 to 3 (referenced 21, 22, 23) form the message transfer part (MTP) 24. The MTP 24 is responsible for transferring signalling information between signalling points in messages. Level 4 (not referenced as a whole) comprises circuit-related user parts, namely ISDN User Part (ISUP) 26 and Telephone User Part (TUP) 27. These user parts define the meaning of the messages transferred by the MTP 24 and provide functionality to the users of SS7 (block 29). The user parts 26 and 27 are specific to particular types of circuit-related applications as indicated by their names. In fact, the ISUP is the most important user part, the TUP being a subset of ISUP and having been largely replaced by the latter. Most inter-exchange signalling, such as between SSPs 11 in FIG. 1, uses ISUP messages.

As well as the circuit-related user parts, SS7 level 4 also includes functional elements defining a general protocol for non-circuit-related information, such as operations, maintenance and administration information or network database information. The main functional element in this Level 4 protocol is the Transaction Capabilities (TC) 30 which sits on top of a Signalling-Connection-Control Part (SCCP) 31 and beneath a TC Users element 32.

The SCCP 31 actually forms part of the transfer mechanism for non-circuit-related applications, combining with MTP 24 to provide transfer mechanisms (both connection-less and connection oriented) meeting the Open Systems Interconnection (OSI) Layer ¾ boundary requirements. TC 30 itself comprises two elements, namely an intermediate-services part (ISP) and a transaction-capabilities application part (TCAP); ISP is only used for connection-oriented services. Users of the SCCP/TC stack include the INAP (Intelligent Network Application Part) 32 and MAP (Mobile Application Part) 33. With reference to FIG. 1, messages passed between an SSP 11 (FIG. 1) and SCP 13 will be INAP messages using SCCP/TC (in fact, such messages are generally concerned with real time query/response transactions for which a connectionless service is most appropriate so that only the TCAP part of TC is used). Some inter-exchange signalling may also use SCCP/TC messages where, for example, the purpose of the signalling is service related rather than circuit related. ISUP may also use the SCCP for certain messages.

Considering the MTP 24 in a little more detail, Level 1 (reference 21) defines the physical, electrical and functional characteristics of the transmission path for signalling; typically, this will be a 64 kbit/s slot in a multiplexed stream. MTP Level 2 (reference 22) defines the functions and procedures for the transfer of signalling messages over a link between two directly-connected signalling points. MTP Level 3 (reference 23) provides functions for the reliable transfer of signalling information from one signalling end point to another. Thus, Level 3 is responsible for those functions that are appropriate to a number of signalling links, these being separable into signalling-message handling functions and signalling-network management functions.

When considering the passing of messages over a single link, it is the combination of Levels 1 and 2 that provides for the reliable transfer of signalling information. The Level 2 functions provide a framework in which the information is transferred and performs error-detection and error-correction processes; the Level 2 functions are carried out afresh on a link-by-link basis. At Level 2, information is seen as being transferred between signalling points in messages known as "signal units".

The general form of a signal unit 40 is shown in FIG. 3. As can be seen, a field 41 carrying message/data is encapsulated in a Level 2 framework comprising the following fields: a flag field; a backward sequence number field (BSN); a backward-indicator bit (BIB); a forward sequence number field (FSN); a forward-indicator bit (FIB); a length indicator field (LI); a spare field (SP); a check field; and a terminating flag field. The FSN, FIB, BSN, BIB and check fields provide error correction functionality at link level in a manner well understood by persons skilled in the art.

There are three types of signalling unit:

MSU—the Message Signal Unit—MSUs carry all service/application data sent on the SS7 network. The amount of data per MSU is limited to 273 octets maximum.

LSSU—the Link Status Signal Unit—LSSUs carry information relating to the status of the link and are therefore concerned with Level 2 functions. Normally, LSSUs are only seen during the initial alignment procedure when a link is brought into service but are used at other times, for example, to stop the flow of signal units when processors are busy.

FISU—the Fill-In Signal Unit—When no MSUs or LSSUs are to be sent, a signalling point continually sends FISUs. FISUs carry basic Level 2 information only, for example, the acknowledgement of the last MSU (field 41 is empty).

The length indicator (LI) within each message indicates the signal unit type as follows: LI=0 means FISU; LI=1 or 2 means LSSU; and LI=3 or more means MSU.

FIG. 3 further illustrates at 42 the basic format of an MSU; as can be seen, it comprises a service information octet SIO of 8 bits and a signalling information field SIF of 8n bits, where n is a positive integer. The SIO field includes a Service Indicator sub-field that defines the user part or equivalent appropriate to the message. The SIF contains the information being transferred and will generally include a routing label 43 comprising a 14-bit destination point code indicating the destination signalling end point, a 14-bit originating point code indicating the originating signalling end point, and a 4-bit signalling link selection field for specifying a particular link in cases where two signalling points are linked by a multiple-link link set. The MTP 24 is not aware of the contents of the SIF other than the routing label.

As an example of the information that may be borne by an MSU, FIG. 4 illustrates the general format of an ISUP message. As can be seen, in addition to the routing label 43, an ISUP message comprises a circuit-identification code (CIC) 44 indicating the number of the speech circuit between two exchanges to which the message refers, a message type code 45, and a number of parameters organised into three parts 30 46, 47, 48 according to type. Mandatory parameters of fixed length are placed in the mandatory fixed part 46. Mandatory parameters of variable length are placed in the variable mandatory part 47. Optional parameters are placed in the optional part 48. A typical ISUP message is the initial address message (IAM) which is the first ISUP message sent out when a call is being set up; the IAM will contain the required address (e.g. the digits dialled by the calling customer) and it results in a seizure of a circuit by each exchange along the route to the called-party exchange.

FIG. 5 illustrates the format of another message type that may be carried in the SIF, this time an SCCP message. The message format is, in fact, very similar to that of FIG. 4 but without the CIC field (as already indicated, SCCP messages generally concern non-circuit related messaging). A typical use for SCCP messages is to carry query/response messages between a SSP and an SCP, this being done in SCCP messages of the Unitdata type that utilise a connectionless service.

Liberalisation of the telecommunication industry coupled with the widespread deployment of intelligent network services is placing new demands on the signalling network at an ever increasing rate. Often there is a shortfall between what the existing network elements of the signalling system can provide in the short term and the demand for new services; this is in part due to the substantial expense and time involved to modify and requalify the operating software of major elements such as SSPs, SCPs and STPs.

As an example of the sort of problem encountered, a new customer service may result in heavier than expected loading of the relatively few SCPs in a network with the result that the SCPs present a potential bottleneck. Whilst more SCPs could be provided to handle the extra service requests, this is an expensive solution and one requiring long term planning. What is required is a way of at least temporarily increasing the service request handling capacity of the signalling system without massive investment and planning. Another example is the massive investment currently being required in the USA to support local number portability; implementation of this service according to the most commonly accepted solution calls for major changes to the SSP software to effect database lookups for ported numbers. Again what is required is a solution not involving massive upgrading of existing network elements.

In an attempt to deal with the SCP bottleneck problem referred to above, it has been proposed in EP-A-0 669 771 to provide a message interceptor for intercepting messages sent to an SCP to selectively suppress the messages or modify them (for example, to effect syntax translation or decryption) before forwarding the messages to the SCP. The message interceptor thus serves to relieve the SCP of some of its processing tasks and thereby avoid congestion.

FIG. 6 shows one embodiment of the message interceptor described in EP-A-0 669 771. The message interceptor is inserted in a link 52A, 53A, 52B, 53B with each link half 52A, 52B; 53A, 53B being terminated at a corresponding interface 50; 51 and MTP level-2 protocol engine 54; 55. The two level-2 protocol engines 54, 55 are connected through transfer circuits 56 that comprise MTP level 3 functionality 58 receiving both MSU data and link status information from the protocol engines. MSU data related to signalling network management and maintenance are identified (Service Indicator value less than 3) and handled entirely within the MTP level-3 block 58, these data being acted upon if addressed to the message interceptor itself as indicated by a match between the destination point code in the routing label and the signalling point code allotted to (and stored by) the message interceptor. MSU data related to higher levels are passed up to interception functionality (blocks 59). These blocks 59 contain the message interception functionality for selectively modifying or suppressing messages. Thus, each block 59 selectively acts on the data it receives and, where appropriate, then passes data (which may include response data) back to the MTP level-3 block 58 for transmission to the appropriate destination.

A key characteristic of this message interceptor is that it operates separate level-2 links with the two signalling points at either end of the original link in which the interceptor has been inserted. These two links run by the interceptor will have different states and therefore it is not possible simply to bypass the message interceptor in the event of failure. Instead, any failure must be handled as for the failure of any signalling point by the relevant MTP level 3 mechanisms in a way which will be evident to other signalling points, particularly those at either end of the original link. The message interceptor is therefore not transparent and will affect the surrounding network, at least on failure.

It is an object of the present invention to provide apparatus that can be used to modify signalling messages on a link but which is less intrusive than that of the prior art.

SUMMARY OF THE INVENTION

According to the present invention, there is provided apparatus insertable in a signalling link between two signalling points for modifying selected messages that are passing over the link in accordance with a link-level protocol, this protocol having state-based procedures that use link-level data carried by the messages; the apparatus comprising:

an input and an output to which respective portions of the link can be connected, message path means extending between the input and output and comprising:
  receive means connected to the apparatus input for receiving messages from the link and decoding them to form corresponding decoded messages including the link-level data of the messages,
  queue means connected to the receive means for queuing decoded messages in FIFO order, and
  transmit means for taking decoded messages from the queue means, re-coding them and passing them to the apparatus output, selection means for selecting particular messages passing along the message path means according to at least one predetermined criterion, the selection means generating a modification signal in respect of each said particular message concerning a modification to be effected thereto; and modification means responsive to the modification signals for effecting the desired modifications to said particular messages in passage through the message path means;

any differences introduced into messages as they pass through the apparatus between the input and output of the apparatus being such that the state-based procedures of the link-level protocol are undisrupted thereby.

Preferably, the apparatus further comprises bypass means for selectively providing a direct connection between the input and output of the apparatus to bypass the message path means and pass messages unmodified through the apparatus. For controlling the bypass means, the apparatus may include a supervision unit for comparing the flow of messages through the input and output of the apparatus in order to detect abnormal operation, the supervision unit being operative upon detecting such abnormal operation, to cause the bypass means to bypass the message path means.

Advantageously, the apparatus also comprises test means for testing the operation of the message path means when the bypass means is bypassing the message path means, the test means comprising:

loopback means for connecting an output of the transmit means to an input of the receive means, insertion means for inserting predetermined messages in the message path means and causing them to circulate therearound, and comparison means for comparing the original form of the predetermined messages with the circulated messages after the latter have undergone at least one traverse of the message path means, the comparison means only permitting the un-bypassing of the message path means by the bypass means in the absence of unexpected differences between the compared messages.

As regards the modification means, this is preferably operative to modify said particular messages whilst the latter are passing as decoded messages through the queue means. In addition, the modification signal is preferably passed from the selection means to the modification means separately from the said particular message concerned, the modification signal including an identifier which is also associated with the said particular message concerned and which is used by the modification means to associate the modification signal with the message to be modified. Advantageously, the identifier is a timestamp associated with the message by the receive means.

The modification signal may comprise the existing value of a parameter carried by the corresponding said particular message, the modification means using this existing value to lookup a new value for substitution for the existing value. The modification signal may alternatively or additionally comprise a swap indication indicating that the value of two parameters carried by the corresponding said particular message are to be swapped, the modification means being responsive to the swap indication to swap the relevant parameters of the said particular message concerned. Again, the modification signal may alternatively or additionally comprise a predetermined-modification indication indicating that the value of a particular parameter carried by the corresponding said particular message is to be modified to a predetermined value, the modification means being responsive to the predetermined-modification indication to set the particular parameter of the said particular message concerned to the predetermined value.

Advantageously, the apparatus further includes bandwidth balancing means for taking action to compensate for any increases in message length due to message modification, the bandwidth balancing means comprising:

delay monitoring means for deriving a delay indication indicative of the delay experienced by messages passing through the message path means, and delay control means for reducing this delay upon the delay indication indicating that the delay has become too large.

Preferably, the delay monitoring means comprises:

means for generating a time reference signal indicative of a current time for the apparatus, timestamp means for associating a timestamp with each message received by the receive means, this timestamp being derived from the time reference signal and indicating the current apparatus time at which the message is processed by said receive means, and means for generating the said delay indication as the time difference between the current apparatus time and the time value of the timestamp associated with the message at or adjacent the head of the queue means;

the delay control means taking action to reduce said delay upon the time difference exceeding a predetermined threshold. This action may include the deletion of fill-in messages and, where necessary, the deletion of operational messages (this being possible because the link-level procedures will generally cause retransmission of such messages note that in this case, the link-level procedures are not disrupted but merely called into play to exercise their intended functionality).

With regard to the selection means, the said predetermined criterion may comprise at least one predetermined value of at least one parameter carried by said messages. In this case, the receive means is preferably operative to decode messages to make the value of said at least one parameter directly available without further processing of the messages; other message parameters will generally not be fully decoded.

BRIEF DESCRIPTION OF THE DRAWINGS

A programmable message substitution unit (PMSU) embodying the invention will now be described, by way of non-limiting example, with reference to the accompanying diagrammatic drawings, in which:

FIG. 3 is a diagram showing the format of an SS7 message signalling unit (MSU);

FIG. 4 is a diagram of the signalling information field of an ISUP MSU;

FIG. 5 is a diagram of the signalling information field of a SCCP MSU;

BEST MODE OF CARRYING OUT THE INVENTION

PMSU Overview

Figure 1:
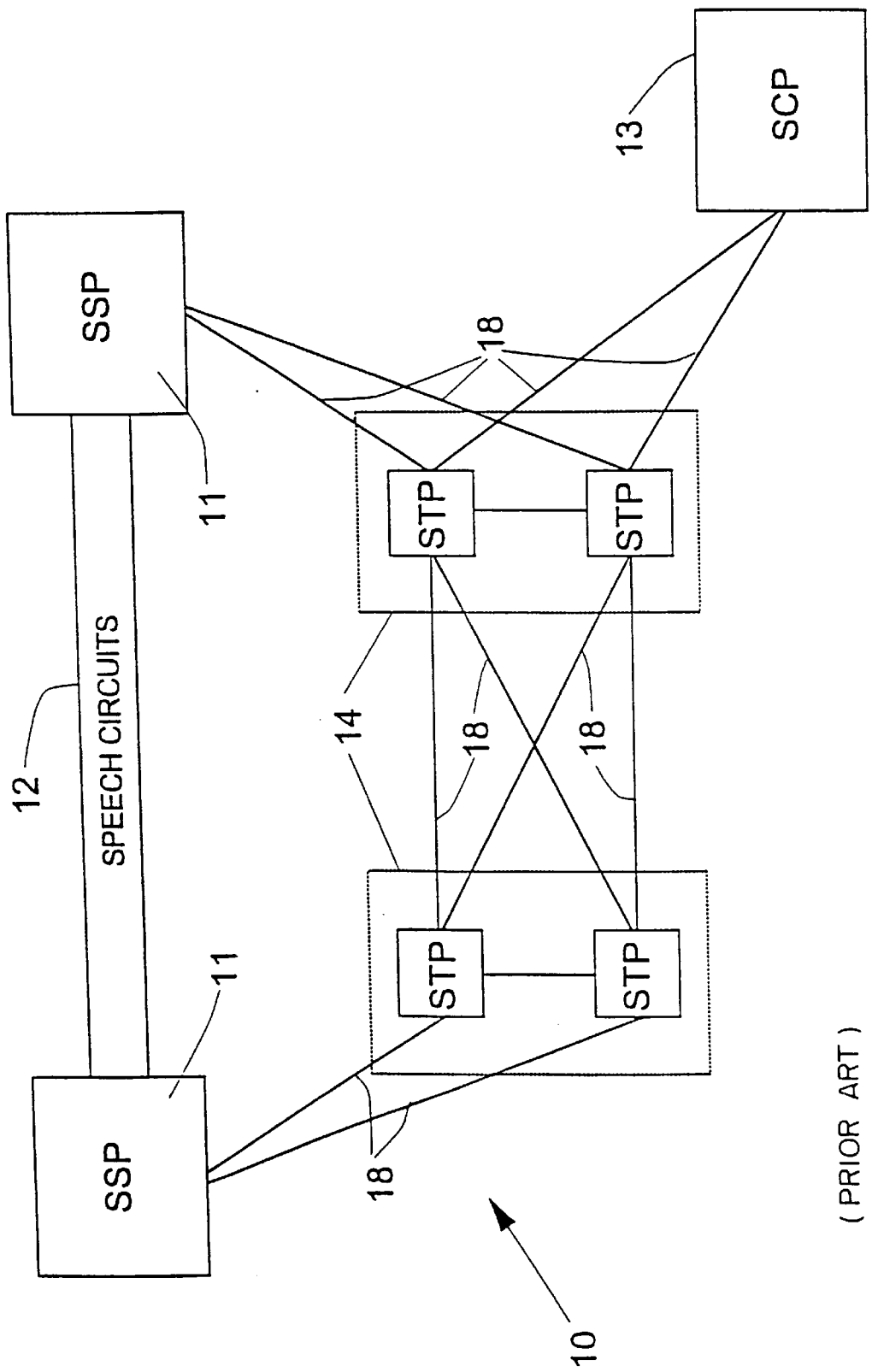
FIG. 1 is a diagram illustrating the main components of a standard SS7 signalling system.
Figure 2:
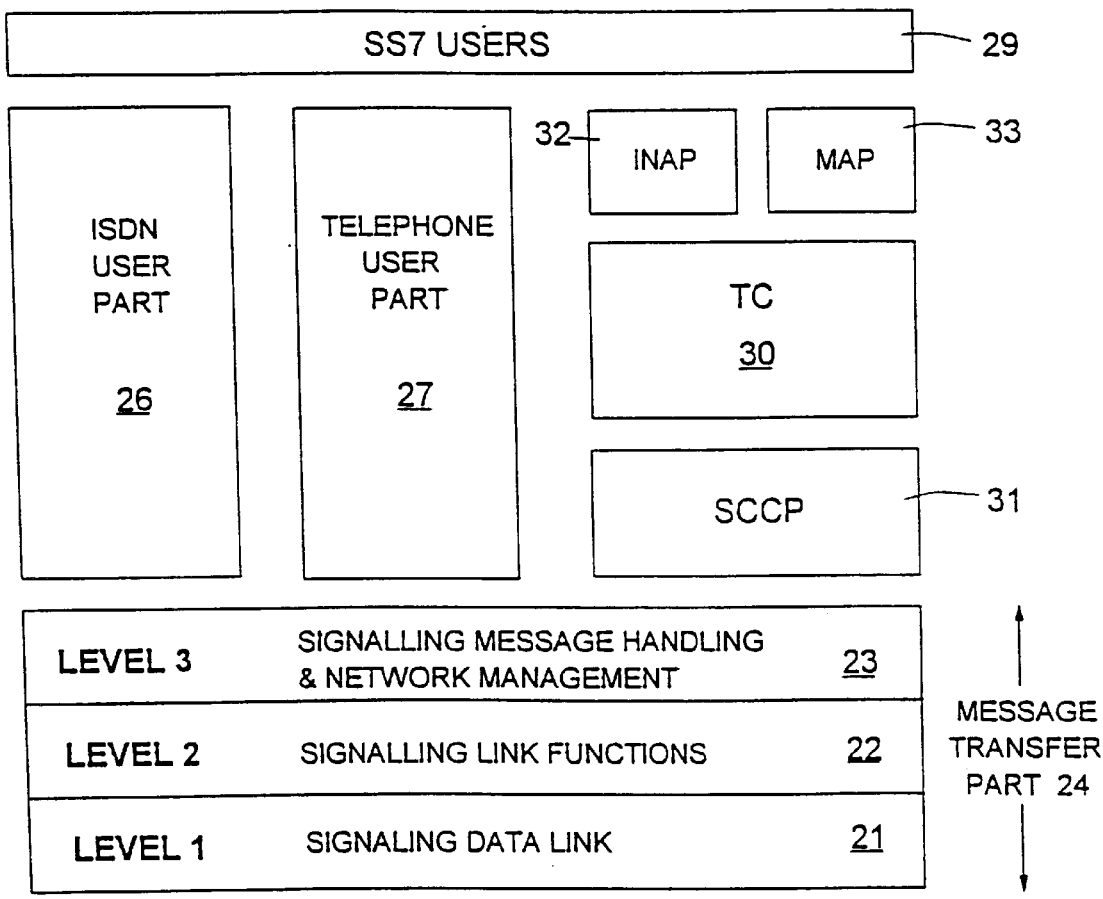
FIG. 2 is a diagram illustrating the basic architecture of the SS7 protocol.
Figure 6:
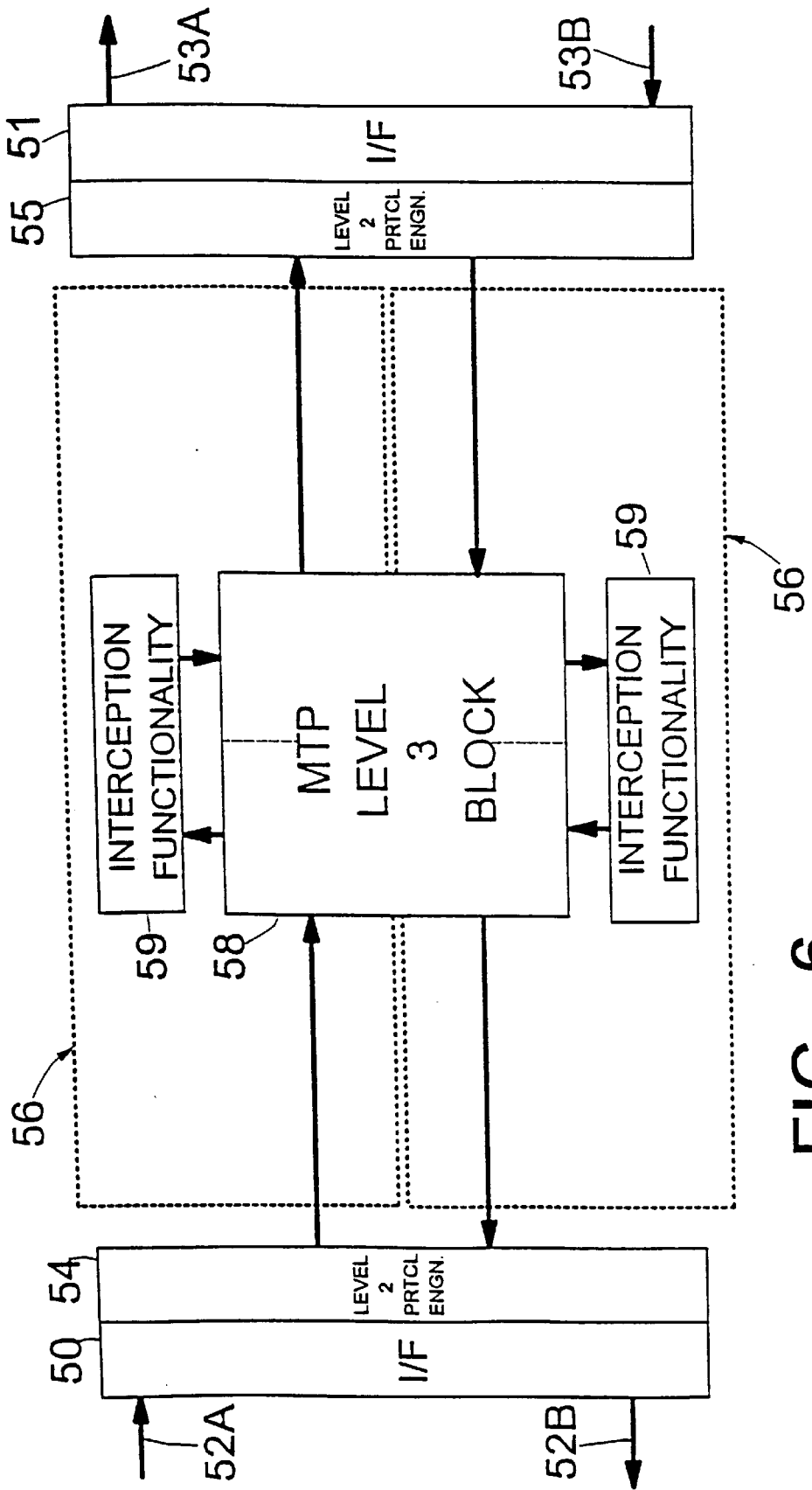
FIG. 6 is a diagram of a prior art message interceptor.
Figure 7:
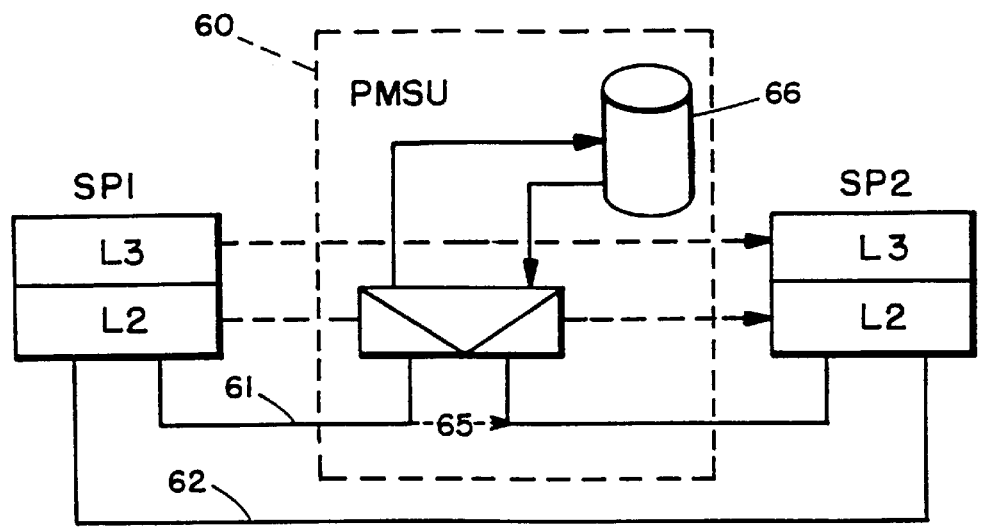
FIG. 7 is a diagram showing the operational placement of the PMSU embodying the invention.

FIG. 7 illustrates the general disposition of a programmable message substitution unit (PMSU) 60 in one channel 61 of a bidirectional link between two signalling points SP1, SP2, this channel 61 passing SS7 signalling messages in a predetermined timeslot of a framed multiplexed stream between the signalling points SP1, SP2. Messages on channel 61 are routed through the PMSU 60 and in effect enter a delay pipe subjecting them to a delay $T_{pmsu}$ (see FIG. 8 which depicts both a message P flowing from SP1 to SP2 along channel 61 and a return message Q flowing from SP2 to SP1 along channel 62 which does not pass through the PMSU 60 so there is no delay $T_{pmsu}$ in this channel—in practice, it may be expected that both channels of a link will have a PMSU inserted). The value of $T_{pmsu}$ is arranged to be of the order of 20 ms (it should not be greater than 40 ms to avoid exceeding the acknowledgment time limit and link bandwidth limit of current SS7 systems).

As each SS7 message passes through the PMSU 60, it is examined by comparing its type and possibly the values of other parameters with trigger condition data programmed into the PMSU. For each message meeting the trigger conditions, the PMSU will carry out predetermined processing generally involving a database lookup in database subsystem 66 (which may include referencing an external database) and, as a result, the message may be modified before being forwarded on channel 61. Messages are not, however, inserted and are only deleted where essential for bandwidth balancing (see hereinafter).

A key feature of the PMSU 60 is that it ensures that the connection between SP1 and SP2 can be managed as a single span at MTP levels 1 and 2, the PMSU acting as a level 1 repeater and leaving unmodified level 2 state-based protocol procedures viz. backward error correction and flow control (the PMSU may, however, modify error checking and delimitation procedures which are stateless transformations). More particularly, at level 1, the PMSU:

passes through the embedded operation channel traffic (FDL bits on T1 span);

locks the de-framer and re-framer of the PMSU to the recovered clock of the incoming bearer stream, mimics events received on the incoming bearer stream such as loss of signal, loss of alignment, and CRC errors (CRC-6 for T1, CRC-4 for E1) on the outgoing bearer stream;

whilst at level 2, the PMSU:

leaves unmodified state based procedures such as backward error correction, flow control and link alignment;

mimics link events such as loss of frame alignment, CRC-16 errors, aborts, long and short frames;

includes a bandwidth balance feature to recover idle time on the link and use it for messages whose transmission time may have increased as a result of octets inserted by the PMSU.

As a result of the foregoing measures, should a fault occur in the PMSU which requires switching the device out of circuit (by means of a relay arrangement 65) then the level 2 entities at SP1 and SP2 remain in synchronisation.

The act of switching the relay arrangement 65 to bypass the PMSU 60 in the event of failure will be seen as bit errors which are corrected by level 2 backward error correction procedures in the SP1 and SP2. Thus the SP1 and SP2 will generally remain in synchronism in the event of failure of the PMSU 60.

Figure 8:
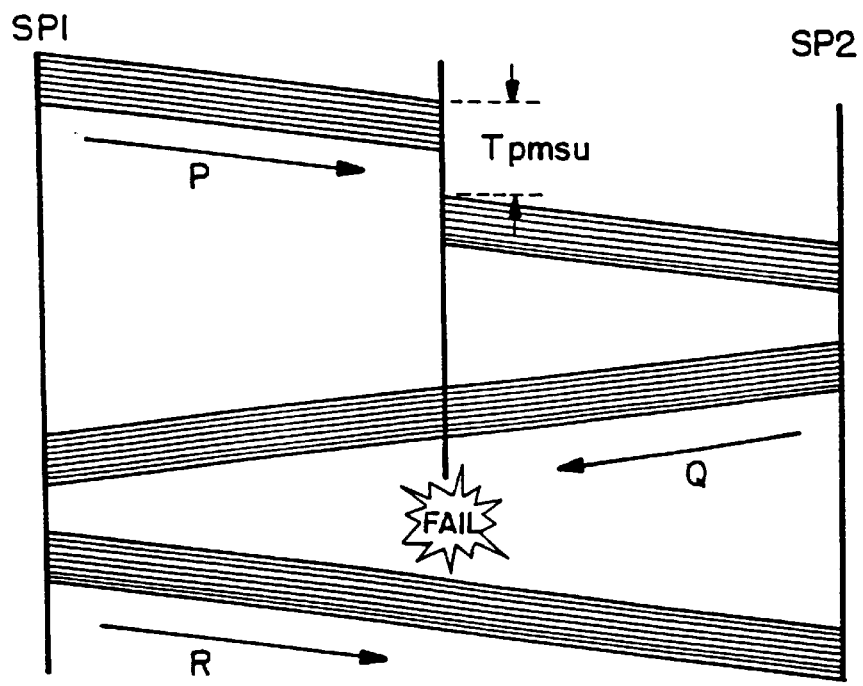
FIG. 8 is a time diagram illustrating the delay $T_{pmsu}$ introduced by the PMSU.

When the bypass relay arrangement 65 is switched in there will, of course, be no delay $T_{pmsu}$ in messages passing along channel 61 (see message R in FIG. 8).

PMSU Architecture

Figure 9:
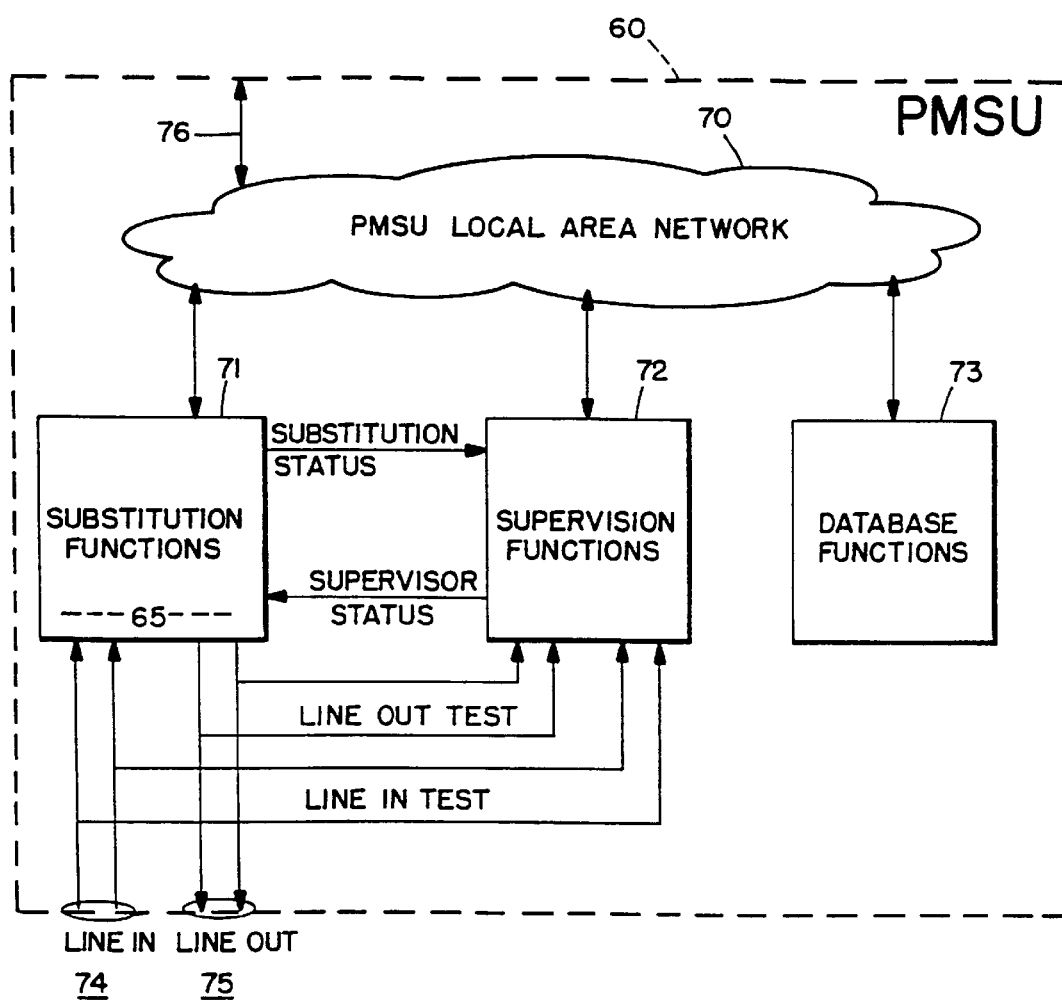
FIG. 9 is a block diagram showing the main functional units of the PMSU.

FIG. 9 shows the functional entities 70, 71, 72, 73 of the PMSU 60 for a single SS7 channel (a uni-directional connection in a bi-directional link). The SS7 incoming and outgoing channels are shown as tip/ring pairs 74, 75 to highlight the level 1 wiring requirements. In a physical implementation of the PMSU, the functional entities may be implemented as a distinct card, integrated on a card with other functional blocks or distributed across two or more cards. The roles of the functional entities 70–73 are summarised below:

PMSU Local Area Network 70 provides an infrastructure to allow the various functional blocks 71–73 in the PMSU 60 to communicate with each other;

provides a connection path (via 76) for the PMSU 60 to share its services with other units in a network.

Substitution Block 71 splits and terminates the SS7 channel;

acquires SS7 frames at level 1;

extracts level ¾ protocol information from each SS7 message and modifies selected messages as required (this generally involves a database lookup to block 73 to retrieve new parameter values to be substituted for existing ones);

delays SS7 frames by a controlled amount and re-transmits at level 1;

completes external circuit via relay arrangement 65 on power fail, on command from the supervision block 72, or upon failure of the latter.

Supervision Block 72 passively monitors both incoming and outgoing legs of SS7 channel;

gathers statistics on the performance of the substitution block 71 and shuts it down in the event of a fault;

services configuration requests and maintains a Management Information Base (MIB) for network management systems.

Database Block 73 services lookup requests (primarily from the substitution block 71) and returns the result using the level ¾ in the request as a key.

Figure 10:
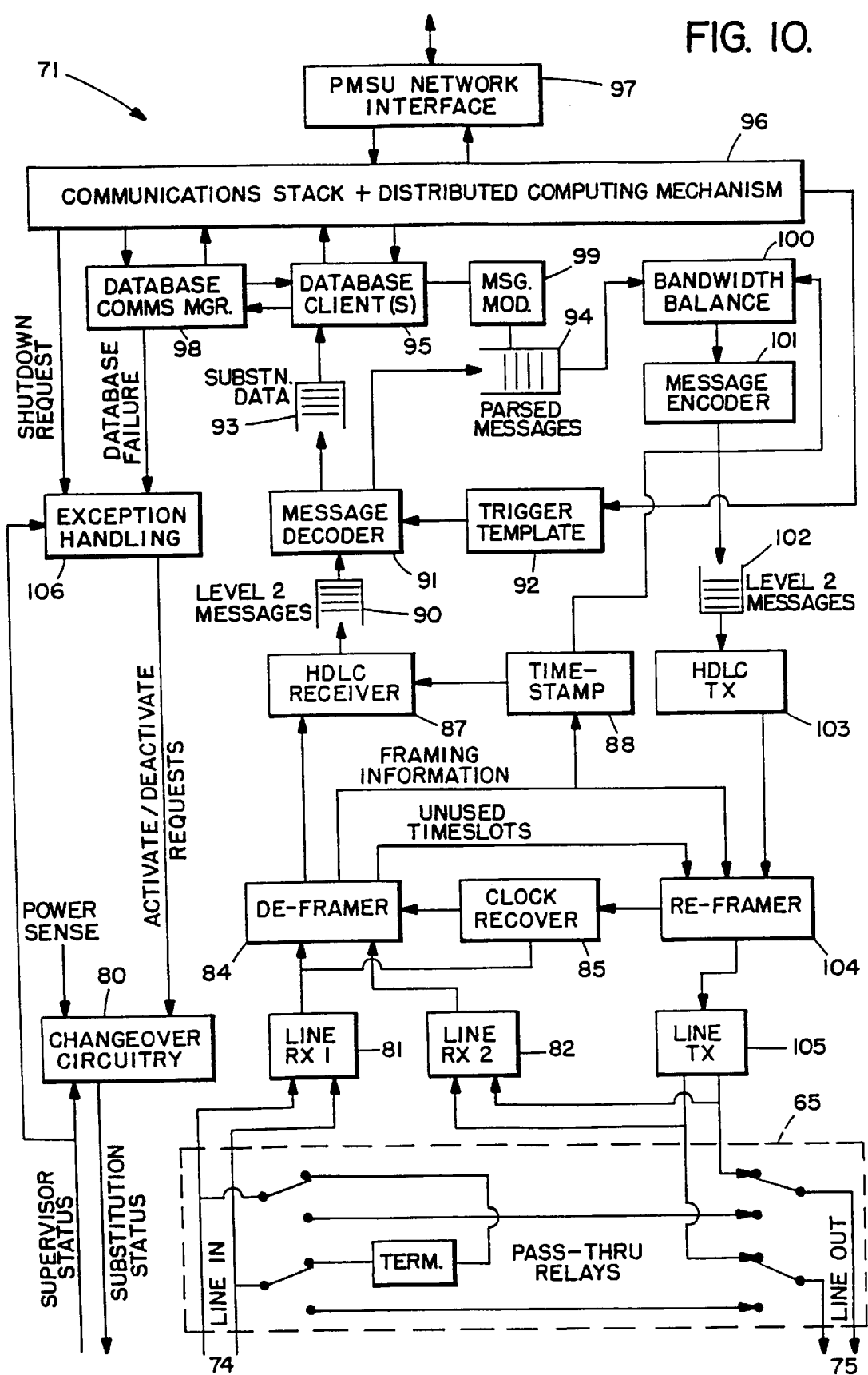
FIG. 10 is a diagram of the substitution functional block shown in FIG. 9.
Figure 11:
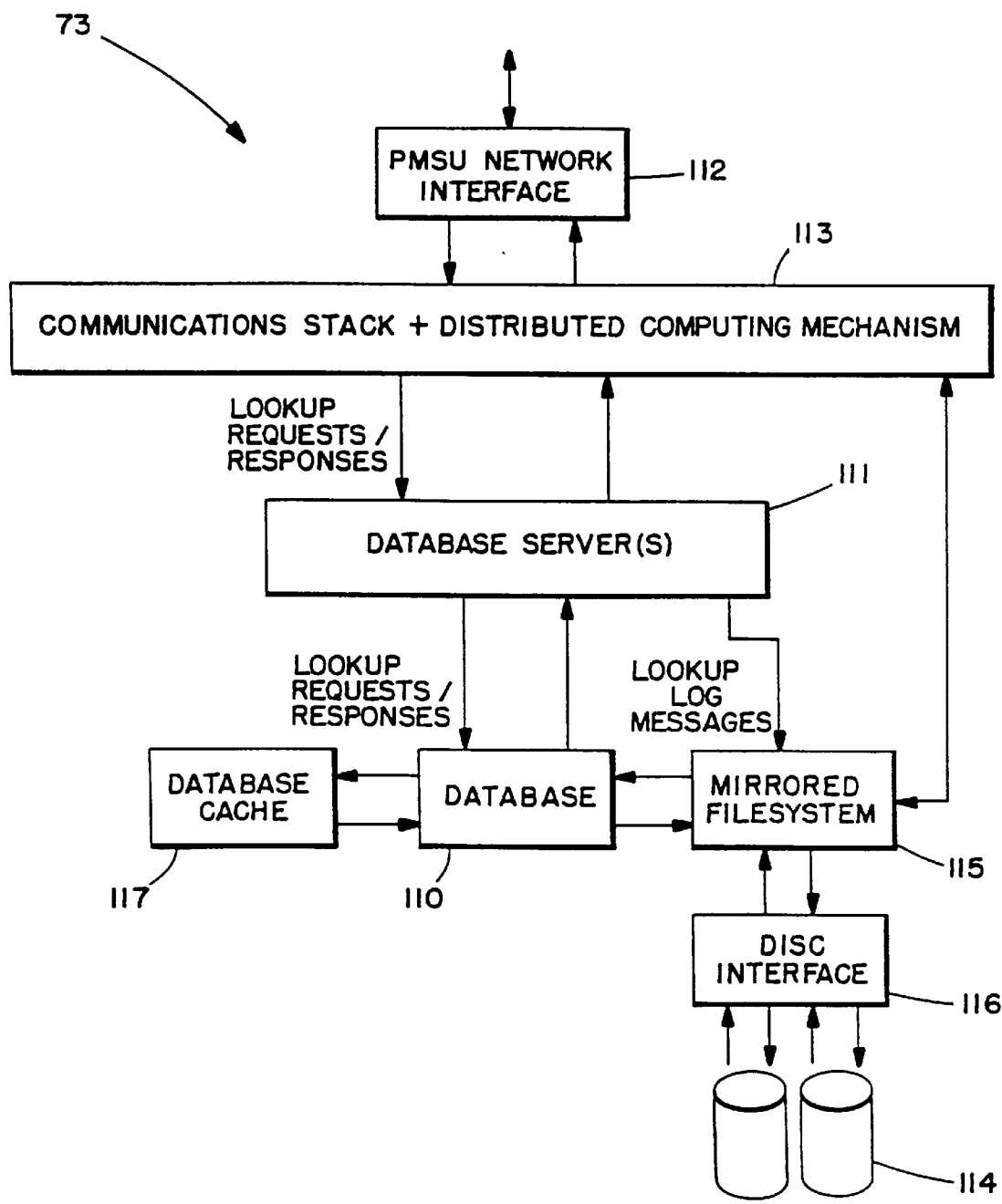
FIG. 11 is a diagram of the database functional block shown in FIG. 9.
Figure 12:
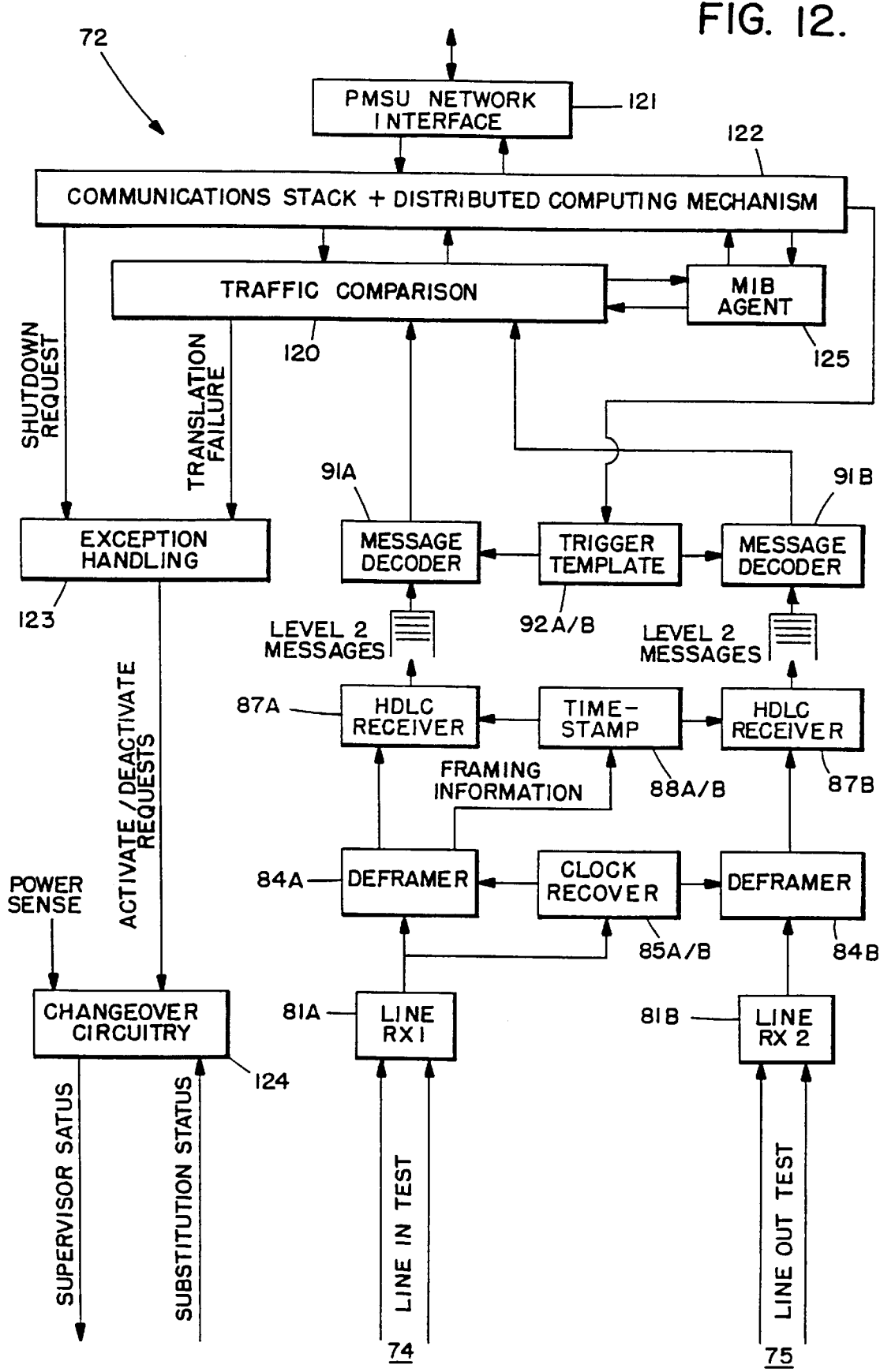
FIG. 12 is a diagram of the supervision functional block shown in FIG. 9.

Each of the three main blocks 71 to 73 will now be considered in more detail with reference to FIGS. 10 to 12 respectively. In these Figures, functions performed primarily by dedicated hardware are shown in rectangular boxes whereas functions performed in software running on a program controlled processor of the PMSU are shown in rounded boxes. It will be appreciated that the split of functionality between hardware and software can be varied from that illustrated in FIGS. 10 to 12.

It should also be noted that in the following the references to "G.xyz" and "Q.xyz" are references to CCITT Recommendations relevant to SS7 signalling as will be apparent to persons skilled in the art.

Substitution Block

As shown in FIG. 10, the line-in and line-out pairs 74 and 75 are connected to the bypass (pass thru) relay arrangement 65 of the substitution block. The relay arrangement is controlled by changeover circuitry 80 which receives inputs from several sources as will be more fully described hereinafter. At power-on or in the event of failure, the relay arrangement is in its opposite state to that illustrated in FIG. 10 with the line-in pair 74 being connected to the line-out pair through a low impedance path. However, during normal operation of the PMSU, the changeover circuitry 80 places the relay arrangement 65 in its illustrated state in which the line-in pair 74 is terminated and passively monitored by a first line receiver 81, and the line-out pair is driven by a line transmitter 105.

Line receiver 81 transforms the bipolar analogue signal monitored on line-in pair 74 into a digital bitstream as described in the procedures in G.703. This digital stream is passed to a clock recovery circuit 85 which extracts timing information in the signal to delimit bit-cells. The line transmitter 105 performs the opposite transform to the line receiver 81. The line transmitter 105 as well as being connected to the relay arrangement 65, is also connected to a second line receiver 82 to provide a loopback into the message receive path for continuity testing as will be described below.

A de-framer block 84 can select either line receiver 81 or 82 as its signal source and performs frame alignment and error detection for the framing structures defined in G.704 according to the procedures defined in G.706 using the output of the clock recovery block 85 to identify bit cells. An SS7 channel occupies a timeslot in the received multiplex framing structure and this is de-multiplexed and passed to an HDLC receiver 87. The other timeslots of the framing structure are passed to a re-framer 104 together with the embedded operations channel and error check information contained in the framing signal. The re-framer 104 reconstitutes a framing structure from the inputs received from de-framer 84 together with SS7 channel information received from an HDLC transmitter 103; the reconstituted framing structure is passed to the line transmitter 105. Of primary interest is, of course, the processing of the SS7 channel between the HDLC receiver and transmitter and this will now be described.

As the framing signal of the received multiplex stream is transmitted every 125 b $\mu$s, it can be used as a timing source for the substitution functions. Accordingly, the de-framer 84 is arranged to output the framing signal to a timestamp block every 125 $\mu$s in order to increment an internal counter of the latter. The HDLC receiver 87 acquires MTP L2 signal units (defined in Q.703) de-limited by flags and removes bits inserted for data transparency according to the procedures in Q.703. The signal units are checked by the HDLC receiver 87 against the Q.703 criteria for frame length and also that the CCITT-16 CRC check is correct; signal units that satisfy both checks are tagged as 'good' and all other signal units are tagged as 'errored'. The signal units are then packaged in a level 2 message structure which is timestamped using the time reported by the timestamp block and placed in a queue 90 for decoding.

The level 2 messages in queue 90 are taken in FIFO order by a message decoder 91 that has knowledge of the decoding rules used at level 3 and above in order to effect decoding to a level sufficient to discriminate the particular signalling parameters listed as of interest either as selection (trigger) criteria for selecting messages for parameter modification or as parameters that may be modified. The parsed level 2 message with its extracted signalling parameters is packaged in a parsed message structure; level 2 state-based procedural information is also stored in the parsed message structure.

The message decoder 91 is also supplied with a number of trigger templates from store 92 identifying by the value of particular signalling parameters which messages are to be subject to parameter modification (generally by value substitution). The trigger templates are provided to store 92 over the PMSU local area network 70 from, for example, an external management station, the substitution block 71 interfacing with the PMSU local area network through a hardware interface 97 and a communications stack 96. The number of trigger templates will depend on the number of different types of modification to be carried out; if only one type of modification is to be effected then only one template may be needed (for example, if only location routing number substitution is to be effected, then only one template is needed, this template being used to select ISUP IAMs for which no LRN substitution has been made). The message decoder 91 applies the trigger templates against each parsed message structure. If a template match is found, then one or more parameters of the message are to be modified and a substitution-data structure is created containing: a substitution code indicating the nature of the modification to be effected (this code is associated with the matched template); the parameters to be modified and their current values (these values will generally be needed to effect a database lookup); an identification of the database server to be used for substitution data lookup (this server identification is stored along with each trigger template); and the timestamp associated with the message. This substitution-data structure is placed in a queue 93.

Whether or not decoder 91 matched a template with the message being processed, the parsed message structure for that message is placed in queue 94. Messages tagged as errored do not undergo template matching in decoder 91 but are passed direct to queue 94.

It should be noted that whilst most parameter modifications effected by the substitution block 71 involve using the existing value of a parameter to lookup a new value which is then substituted for the old one, other modification may also be effected. For example, it may be required to interchange the destination point code and originating point code of the message; obviously, this does not require a database lookup and in this case the substitution code of the substitution-data structure would indicate this (the substitution-data structure may, or may not, include the point codes depending on how this substitution is to be effected). By way of further example, it may be required to change a message type indicator field to a particular value and again this would be indicated by the substitution code.

It should also be noted that there may not be a one-to-one correspondence between existing parameters and those to be substituted and again it is the substitution code which indicates what substitution action is to be taken.

As a database lookup will be required in most cases, the following description concerns itself with such a case but it should be borne in mind that such a lookup may not always be needed.

The queue 93 of substitution-data structures is serviced by one or more database clients 95 in a FIFO fashion. If the substitution code of a substitution-data structure indicates that a database lookup is required, then the client 95 concerned requests the use of a database lookup service located on the server identified in the substitution-data structure, this lookup being effected using the signalling parameter values in the structure as database keys. Communication with the server is made using communications stack and distributed computing mechanism 96 in order to provide a secure, resilient and machine independent connection (e.g. OSF DCE running over TCP/IP). The physical layer of the connection is the local area network 70 within the PMSU which has a bus topology to eliminate single points of failure. The external connection 76 to this LAN (FIG. 9) is provided to allow PMSUs to be networked together and share databases in the event of failure. Connections to database servers are managed by a database communication manager 98 which monitors the performance of the database servers and selects backup servers in the event of failure to meet lookup targets.

Upon a valid response being returned by the database server to the requesting database client 95, the client 95 passes this data and relevant portions of the substitution-data structure (including the substitution code and timestamp) to a message modification block 99. If no database lookup was called for by the substitution code of a substitution-data structure, the latter is passed directly to block 99 by the client 95.

Block 99 now proceeds to effect the required substitution, into the corresponding parsed message structure in queue 94; as already indicated, this substitution may involve a variety of substitutions and not simply a direct one-for-one substitution and it is the responsibility of the block 99 to effect the appropriate substitution according to the substitution code concerned. Association of the substitution-data passed to block 99 with the corresponding parsed message structure is by means of the timestamp common to both.

The head of the parsed-message queue 94 effectively corresponds to the head of the delay pipe for messages passing through the PMSU. It is important that the delay through the PMSU is kept under control and, as already indicated, a suitable target value for this delay $T_{pmsu}$ is 20 ms. It is the responsibility of bandwidth balance block 100 to monitor the delay and take appropriate corrective action when necessary. More particularly, bandwidth balance block 100 checks if the timestamp of the message at the head of queue 94 indicates that the message was received at a time interval $T_{pmsu}$ before the time currently shown by the counter of the timestamp block 88. Calling this difference $T_{diff}$ there are two cases to consider:

$T_{diff}$ is less than, equal to or slightly greater than $T_{pmsu}$; in this case, the message is passed to the transmit chain (blocks 101 to 105);

$T_{diff}$ is significantly larger than $T_{pmsu}$; this situation indicates that the delay pipe has grown owing to an increase in length of the preceding message which in turn was caused by a substitution.

In the second case there are several strategies available to the bandwidth balance block 100 to recover bandwidth and these are applied in the following order:

1. Use gaps between frames: if the time difference between the timestamps of the first and second messages (frames) in the queue is greater than the time it would take to transmit the first message in the queue, then the first message is passed to the transmit chain. The net effect on the link is a delay in receiving the message equal to the time it took to transmit the octets added to the previous message.
2. Delete a FISU: if there is a FISU at the head of the queue then it can be deleted without being transmitted, without affecting L3 data flow, because all the following conditions hold:
   (a) FISUs don't transfer L3 data;
   (b) the FSN information is only significant for MSUs;
   (c) the FIB indication is only significant for MSUs;
   (d) the BSN acknowledgement is caught by the BSN of the next frame;
   (e) the BIB indication is replicated in the BIB of the next frame; and
   (f) a frame must be following (thus guaranteeing (d) and (e)), because strategy 1 above failed.
3. Delete FISU and shift back: if a FISU can be found in the queue then it can be deleted according to the procedure above. The timestamps of all frames which precede the deleted FISU should be incremented by the time it would take to transmit the FISU.
4. Delete an MSU: by deleting an MSU at the head of the queue, bandwidth for the following message will be allocated. The MTP L2 flow control procedure at the SP2 side of the PMSU will then detect a missing sequence number and request re-transmission.

When messages are released by the bandwidth balance block 100 they are passed to a message encoder 101 which performs the opposite transformation to the message decoder 91, i.e. it creates a level 2 message structure from a parsed message structure using the encoding rules at level 3 and above for the extracted signalling parameters. The level 2 message is then queued in queue 102 and in due course converted to a bitstream by the HDLC transmitter 103. The HDLC transmitter inserts delimiting flags, a CCITT-16 CRC check sequence and stuffed zeros for data transparency according to the transmit procedures described in Q.703 for the level 2 message structures tagged as good. For the messages tagged as bad then the error condition captured by the receiver is re-created by the HDLC transmitter e.g. sending seven is if an abort condition was detected.

The bitstream produced by the HDLC transmitter 103 is multiplexed (as a timeslot) into the appropriate framing structure (see G.704) by the re-framer 104 together with the unused timeslots and any embedded operations channel information. As with the HDLC functions, any error condition detected by the de-framer 84 (such as loss of framing or a CRC-⅙ check error) is re-created by the re-framer 104—this an important function as the error counts gathered by the equipment at the line-in side of the PMSU must match those gathered by the equipment on the line-out side. The line transmitter 105 encodes the digital bitstream as a bipolar analogue signal according to the transmit procedures described in G.703.

The data path from line receiver 81 to line transmitter 105 is continually operational. However, the SS7 link is only split and terminated to insert the PMSU into the circuit when all its components are operating correctly. This cutover decision is made by an exception handler 106 and the changeover circuitry 80. The exception handler 106 tracks the performance of the database subsystem 73 via the database communications manager 98. The exception handler 106 also checks the continuity of the receive and transmit paths of the substitution block 71 by enabling loopback of the second line receiver 82 to de-framer 84, and then placing known messages in queue 90 and checking that they are circulated back to this queue without error (the known messages are chosen such that no template will match so that the messages are not modified by block 99).

If no problems are detected by the exception handler, it instructs the changeover circuitry 80 to place the relays 65 into a split/terminate configuration by sending an activate request. The changeover circuitry 80 will only service this request, however, if the supervision block 72 reports, via a supervisor status signal, that the SS7 traffic on the channel passing through the line-in to line-out ports is associated with a link that is in-service (rather than out of alignment, aligning or non-operational). Assuming the supervision status signal indicates all is well, the circuitry 80 connects line receiver 81 to de-framer 84 and switches the relay arrangement into its split and terminate position; circuitry 80 also asserts a substitution status signal.

The decision to release the relay arrangement 65 into a pass-through configuration is also made by the changeover circuitry 80 and the exception handler 106, and it occurs if any of the following conditions arises:

a shutdown request is received by the exception handler via the PMSU LAN interface from a management station. A deactivate request is then sent to the changeover circuitry 80;

the database communications manager 98 can no longer establish contact with a database server which meets its performance targets. A database failure signal is sent to the exception handler 106 which in turn sends a deactivate request to the changeover circuitry 80;

power to the substitution block fails causing a power sense signal to the changeover circuitry 80 to be negated;

the supervision block 72 detects that the transformation performed between the line-in and line-out ports 74, 75 does not meet the functional and performance specifications for the PMSU and causes the supervisor status signal to the changeover circuitry 80 to be negated.

As soon as any of the conditions above arises the changeover circuitry 80 immediately releases the relay arrangement 65 and negates the substitution status signal.

Database Functions

As illustrated in FIG. 11, the database subsystem 73 basically comprises a database 110 and one or more database servers 111. A database lookup request from the substitution block 71 is received by one of the database servers via a network interface 112 and communications stack and distributed computing mechanism 113. Each lookup request contains a list of signalling parameters and parameter values, and the timestamp for the corresponding SS7 message to identify uniquely the transaction; each of the signalling parameter values is used in turn as a key to query a database. The responses for each of the queries are packaged in a lookup response structure together with the timestamp (transaction identifier) of the lookup request and returned to the database client via the PMSU LAN interface. Applications such as billing may require a permanent record of all translations so every lookup request/response pair is packaged in a lookup log structure and logged to disk 114 via a filesystem 115 and disk interface controller 116. Where possible, the disk subsystem should support a RAID 1 (mirrored) configuration in order to maximise the probability of data recovery in the event of a disk failure.

The database engine 110 relies on a file system for storage of the database records and keys and, where possible, this subsystem should also support a RAID 1 configuration to minimise seek time and maximise data protection. Seek time for records can be minimised still further by storing a copy of the most frequently accessed records in a database cache 117 (typically implemented as a dedicated area of random access memory on the CPU running the database). The policy to decide whether a given record should be cached when the number of records in the database exceeds the cache size to store them will depend on the application.

Supervision Block

As shown in FIG. 12, the supervision block 72 comprises two additional instantiations of the receive path of the substitution unit (the same reference numerals are used for corresponding components of the receive paths in FIGS. 10 and 12 but the components of two receive paths of the supervision block have been additionally labelled A and B). The main purpose of the supervision block 72 is to check that the substitution unit performs only the data transformations intended and, to this end, the block 72 further comprises a traffic comparison functional block 120 for comparing the results of decoding the SS7 channel on the line-in pair and line-out pair 75.

The supervision block 72 also includes a PMSU network interface 121 and a communications stack and distributed computing mechanism 122, as well as an exception handler 123 and changeover circuitry 124.

While the PMSU is switched out of circuit (pass-through mode) the substitution status signal arriving at the changeover circuitry 124 from the changeover circuitry 80 of the block 71 is in its negated state and results in the traffic comparison block 120 being caused to test only traffic received by the receive path connected to the line-in pair 74. Provided that the received traffic is associated with a link that is in-service (rather than out of alignment, aligning or non-operational) then the traffic comparison block will instruct the exception handler 123 to send an activation request to the changeover circuitry 124 which in turn asserts the supervisor status signal to the substitution block 71.

While the PMSU is in its split and terminate mode (indicated by the assertion of the substitution status signal by the changeover circuitry 80 of block 71) the traffic comparison block 120 is caused to correlate and compare the traffic on the incoming stream (line-in pair 74) with that on the outgoing stream (line-out pair 75) and to test for any of the following erroneous conditions:

error conditions are not passed through;

messages experience a delay significantly less than or greater than $T_{pmsu}$;

a sequence of two or more messages arriving on the incoming stream has two or more messages deleted on the outgoing stream;

a message encoding rule has been broken on the traffic on the outgoing stream an excessive number of re-transmitted messages is received on the incoming stream. (This may be due to a hardware failure in the transmitter so the unit should be taken out of service as a precautionary measure);

the wrong parameters of a message have been substituted (this is detectable as decoder 91A can generate the appropriate substitution code which the traffic comparison block 120 can then use to check which parameters of the corresponding message of the outgoing stream have been modified).

If any of the above conditions occurs, a translation failure indication is sent by the block 120 to the exception handler 123 which decides if the error is severe enough to warrant taking the PMSU out of circuit. An error regarded as a persistent rather than transitory failure by the exception handler 123 will result in a deactivate request being sent to the changeover circuitry 124 and the subsequent negation of the supervisor status signal (thereby putting the substitution block in its pass-through mode).

The traffic comparison block 120 also stores statistics of parameters such as traffic throughput, breakdown by type and translation performed. These statistics may be retrieved by a MIB (Management Infomation Base) agent 125 which organises the data in a suitable tree structure and arranges access using a protocol such as SNMP or CMIP running over the comms stack 122 and PMSU LAN interface 121 to a management station running a peer stack. The MIB agent 125 can also be used to store configuration data for the PMSU with modification of such data by a management station causing a reconfiguration request to be sent to the appropriate function.

Variants

It will be appreciated that many variants are possible to the above described embodiment. For example, not only can the database client 95 and associated message modification block be replicated to carry out processing in parallel on different messages, but also other parts of the message path through the PMSU such as the message decoder can be replicated for parallel processing of different messages (provided, of course, adequate measures are taken to preserve message order through the PMSU). Furthermore, portions of the PMSU can be replicated and arranged in parallel to replicate the processing of the same messages in order to provide protection of the link during board swaps etc.

In the above-described PMSU, the nature of the modification to be effected by the message modification block 99 is indicated by the substitution code stored in the substitution-data structure formed for each message to be modified. However, the use of such a code is not necessary in situations where the required substitution is implicit in the other information contained in the substitution-data structure—for example, in the simple case of changing the value of given field (such as the Called Party field), then the inclusion of Called Party parameter in the substitution-data structure may be used to indicate that the modification required is a direct substitution of one value of the Called Party parameter for another. In other cases, such as when the originating and destination point codes of a message are to be swapped, it would be possible to store the substitution code with the corresponding parsed message structure in queue 94 and have message modification block 99 effect the required swap as soon as it is able (the block 99 scanning the messages in queue 94 to ascertain which require modification).

In fact, viewing the database clients 95 and message modification block 99 as together forming modification means for implementing message modifications, and considering the message decoder as having a functional entity serving as selection means for selecting the messages to be modified, the operation of the selection means and message modification means can be generalised to the selection means passing the modification means a modification request signal (the substitution-data structure in FIG. 10) that includes an indication of the required modification. The modification means acts upon the modification request to effect any necessary database lookup and then modify the appropriate message in queue 94.

It may also be noted that where the modification request is passed to the modification means separately from the corresponding message as in the described embodiment, then the modification block 99 can identify the message to be modified in queue 94 by use of identifiers other than the described timestamp (although using the timestamp for this purpose is of practical convenience).

Whilst in the described embodiment of the PMSU the selection criteria making up the trigger template are based on the values of particular message parameters, other selection criteria may also be used. For example, it may be desired to redirect every second message being sent to a particular signalling point in which case one of the selection criteria will be a message count criterion (it will be appreciated that to implement this selection scheme, the message decoder 91 must be arranged to store information about messages addressed to the signalling point of interest, though this information may simply be an indication as to whether or not the last such message was redirected).

Another possible modification to the described PMSU would be to have separate queues 94 for messages to be modified and messages not requiring modification. In this case, appropriate measures would need to be taken to ensure that message order was preserved as messages are taken off the head of both queues.

With regard to the relay arrangement 65, it will be appreciated that other forms of electrically controlled switch may be used to implement the means for bypassing the PMSU; thus, for example, it is possible to use analogue switch ICs, FETs, or solid state relays for the arrangement 65.

Although the above description relates to an SS7 signalling network, it will be appreciated that the PMSU could be arranged to operate with other, similar, signalling networks. In particular, it is possible to vary the physical and link levels from that generally specified for an SS7 network. Thus the PMSU may be applied to a signalling network in which the basic link transport mechanism is based on ATM technology, the higher levels still being SS7 conformant.

Specific applications of the PMSU are described in our copending UK patent applications nos. 96 04 379.9, 96 11 935.9, 96 13 434.1, 96 16 003.1 and 96 22 240.1.

We claim:

1. Apparatus insertable in a signalling link between two signalling points for modifying selected messages that are passing over the link in accordance with a link-level protocol, said protocol having state-based procedures that use link-level data carried by the messages; said apparatus comprising:

an input and an output to which respective portions of said link can be connected;

message path means extending between said input and output and comprising:

receive means connected to said input for receiving said messages from the link and decoding them to form corresponding decoded messages including the link-level data of the messages, queue means connected to said receive means for queuing said decoded messages in FIFO order, and transmit means for taking decoded messages from said queue means, re-coding them and passing them to said output, selection means for selecting particular said messages passing along said message path means according to at least one predetermined criterion, said selection means generating a modification signal in respect of each said particular message concerning a modification to be effected thereto; and modification means responsive to said modification signal for effecting the desired modifications to said particular messages in passage through said message path means; any differences introduced into said messages as they pass through the apparatus between said input and output being such that said state-based procedures of said link-level protocol are undisrupted thereby.

2. Apparatus according to claim 1, further comprising bypass means for selectively providing a direct connection between said input and said output to bypass said message path means and pass said messages unmodified through said apparatus.

3. Apparatus according to claim 2, further comprising a supervision unit for comparing the flow of messages through said input and said output in order to detect abnormal operation of said apparatus, said supervision being operative upon detecting such abnormal operation, to cause the bypass means to bypass said message path means.

4. Apparatus according to claim 2, further comprising test means for testing the operation of the message path means when said bypass means is bypassing said message path means, said test means comprising:

loopback means for connecting an output of said transmit means to an input of said receive means, insertion means for inserting predetermined messages in said message path means and causing them to circulate therearound, and comparison means for comparing the original form of said predetermined messages with the circulated messages after the latter have undergone at least one traverse of said message path means, said comparison means only permitting the un-bypassing of said message path means by said bypass means in the absence of unexpected differences between the compared messages.

5. Apparatus according to claim 1, wherein said modification means is operative to modify said particular messages whilst the latter are passing as decoded messages through said queue means.

6. Apparatus according to claim 1, wherein said modification signal is passed from the selection means to said modification means separately from the said particular message concerned, said modification signal including an identifier which is also associated with the said particular message concerned, and said modification means using said identifier to associate the modification signal with the message to be modified.

7. Apparatus according to claim 6, wherein said receive means associates a timestamp with each message, said timestamp constituting said identifier.

8. Apparatus according to claim 1, wherein said modification signal includes the existing value of a parameter carried by the corresponding said particular message, said modification means including:

database lookup means operative to effect a database lookup using said existing parameter value to derive a new parameter value, and substitution means for substituting said new parameter value for said existing parameter value in said corresponding particular message.

9. Apparatus according to claim 1, wherein said modification signal comprises a swap indication indicating that the value of two parameters carried by the corresponding said particular message are to be swapped, said modification means being responsive to said swap indication to swap the relevant parameters of the said particular message concerned.

10. Apparatus according to claim 1, wherein said modification signal comprises a predetermined-modification indication indicating that the value of a particular parameter carried by the corresponding said particular message is to be modified to a predetermined value, said modification means being responsive to said predetermined-modification indication to set the said particular parameter of the said particular message concerned to said predetermined value.

11. Apparatus according to claim 1, further comprising bandwidth balancing means comprising:

delay monitoring means for deriving a delay indication indicative of the delay experienced by messages passing through said message path means, and delay control means for reducing said delay upon said delay indication indicating that the delay has become too large.

12. Apparatus according to claim 11, wherein said delay monitoring means comprises:

means for generating a time reference signal indicative of a current time for the apparatus, timestamp means for associating a timestamp with each message received by said receive means, this timestamp being derived from said time reference signal and indicating the current apparatus time at which the message is processed by said receive means, and means for generating said delay indication as the time difference between the current apparatus time and the time value of the timestamp associated with the message at or adjacent the head of said queue means;

said delay control means taking action to reduce said delay upon said time difference exceeding a predetermined threshold.

13. Apparatus according to claim 12, wherein said messages passing over the link include fill-in messages, said delay control means being operative upon said delay indication indicating that said delay has become too large, to delete the message at the head of said queue means where said message is a said fill-in message, deletion of this message being accompanied by adjustment of the link-level data of the next message in said queue means.

14. Apparatus according to claim 12, wherein said messages passing over the link include fill-in messages, said delay control means being operative upon said delay indication indicating that said delay has become too large, to delete a said fill-in message, if present, in said queue means upstream of its head, such deletion being accompanied by advancement of the timestamps of the messages in said queue means ahead of the deleted message.

15. Apparatus according to claim 12, wherein said delay control means is operative upon said delay indication indicating that said delay has become too large, to delete the message at the head of said queue means, reliance being placed on the link-level procedures operated on the link to cause message retransmission.

16. Apparatus according to claim 1, wherein said receive means is operative to decode said messages to make selected parameters contained in said messages directly available without further processing of the messages.

17. Apparatus according to claim 1, wherein said predetermined criterion used by the selection means comprise at least one predetermined value of at least one parameter carried by said messages, said predetermined criterion being programmable from externally of said apparatus.

\* \* \* \* \*